(12) United States Patent
Maier et al.

(10) Patent No.: US 12,556,666 B2
(45) Date of Patent: Feb. 17, 2026

(54) METHOD AND SYSTEM FOR GENERATING A PIXEL STREAM

(71) Applicant: TriLite Technologies GmbH, Vienna (AT)

(72) Inventors: Franz Josef Maier, Poertschach am Woerthersee (AT); Ben-Daniel Keller, Perchtoldsdorf (AT); Johannes Wolkerstorfer, Graz (AT); Christopher Dissauer-Eberl, Graz (AT)

(73) Assignee: TriLite Technologies GmbH, Vienna (AT)

( * ) Notice: Subject to any disclaimer, the term of this patent is extended or adjusted under 35 U.S.C. 154(b) by 0 days.

(21) Appl. No.: 18/750,182

(22) Filed: Jun. 21, 2024

(65) Prior Publication Data
US 2024/0430390 A1    Dec. 26, 2024

(30) Foreign Application Priority Data

Jun. 22, 2023  (EP) ..................................... 23180876
Jun. 22, 2023  (EP) ..................................... 23180877
Sep. 8, 2023   (EP) ..................................... 23196195

(51) Int. Cl.
*H04N 9/31*  (2006.01)
*G09G 3/02*  (2006.01)

(52) U.S. Cl.
CPC .......... *H04N 9/3135* (2013.01); *G09G 3/025* (2013.01); *H04N 9/3182* (2013.01); *G09G 2360/122* (2013.01); *G09G 2360/16* (2013.01)

(58) Field of Classification Search
CPC ...... H04N 9/3135; H04N 9/31; H04N 9/3182; H04N 9/3194; H04N 9/3129; G09G 3/025; G09G 2360/122; G09G 2360/16
(Continued)

(56) References Cited

U.S. PATENT DOCUMENTS 5,715,021 A   2/1998  Gibeau et al.
5,774,174 A   6/1998  Hardie
(Continued)

FOREIGN PATENT DOCUMENTS

CN  109752839 A   5/2019
GB     2457155 A   8/2009
(Continued)

OTHER PUBLICATIONS

Extended European Search Report received for European Patent Application No. 23180876.7, mailed on Dec. 11, 2023, 14 pages.
(Continued)

*Primary Examiner* — Sherrie Hsia
(74) *Attorney, Agent, or Firm* — Weaver IP L.L.C.

(57) ABSTRACT

A method of generating a pixel stream from an image comprised of pixels which each have a pixel value. The method comprising storing the image in a memory; determining, for each of successive sub-intervals, that pixel that is to be displayed by a light beam within said sub-interval; for each of successive sequences of one or more successive sub-intervals for which the same pixel has been determined: retrieving the pixel value of said pixel from the memory once and appending the retrieved pixel value N times to the pixel stream. Further disclosed is a projection system using this method.

12 Claims, 6 Drawing Sheets

Figure 1:
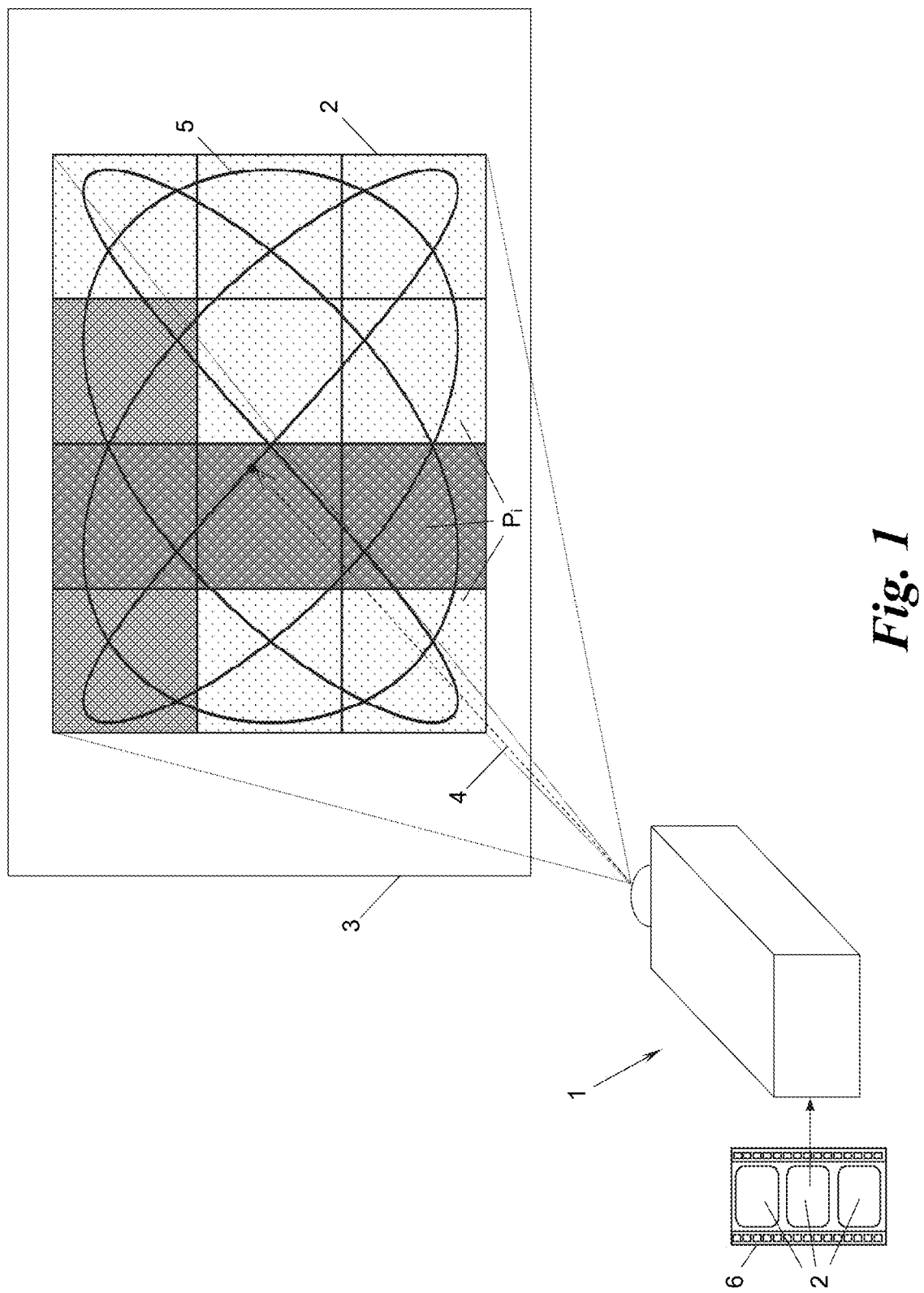

(58) Field of Classification Search
USPC .................................................. 348/744, 739
See application file for complete search history.

(56) References Cited

U.S. PATENT DOCUMENTS

| | | | |
|---|---|---|---|
| 6,373,495 B1 | 4/2002 | Lin et al. | |
| 7,289,169 B2 * | 10/2007 | Suk .......................... | H04N 5/76 348/746 |
| 8,783,874 B1 | 7/2014 | Riza | |
| 10,288,990 B1 | 5/2019 | Ratti et al. | |
| 2008/0136742 A1 | 6/2008 | Tegreene et al. | |
| 2009/0051828 A1 | 2/2009 | Brown et al. | |
| 2010/0208148 A1 | 8/2010 | Deppe | |
| 2012/0127184 A1 | 5/2012 | Satoh et al. | |
| 2012/0275697 A1 | 11/2012 | McDowell et al. | |
| 2014/0126590 A1 | 5/2014 | Kimura | |
| 2016/0044290 A1 | 2/2016 | Morimoto | |
| 2018/0227540 A1 | 8/2018 | Stolitzka | |
| 2018/0308458 A1 | 10/2018 | Hall | |
| 2021/0210031 A1 | 7/2021 | Kang | |
| 2022/0326594 A1 | 10/2022 | Smits | |
| 2023/0370574 A1 | 11/2023 | Blicharski et al. | |
| 2024/0428712 A1 | 12/2024 | Maier et al. | |
| 2024/0428713 A1 | 12/2024 | Maier et al. | |
| 2024/0430456 A1 | 12/2024 | Maier et al. | |

FOREIGN PATENT DOCUMENTS

| | | |
|---|---|---|
| WO | 2019/143525 A1 | 7/2019 |
| WO | 2022/100847 A1 | 5/2022 |

OTHER PUBLICATIONS

Extended European Search Report received for European Patent Application No. 23180877.5, mailed on Dec. 7, 2023, 9 pages.
Extended European Search Report received for European Patent Application No. 23196195.4, mailed on Mar. 11, 2024, 8 pages.
Extended European Search Report received for European Patent Application No. 23214645.6, mailed on May 22, 2024, 11 pages.
Doutre, et al., "An Efficient Compression Scheme for Colour Filter Array Video Sequences", 2006, pp. 166-169.
Final Office Action received for U.S. Appl. No. 18/749,742, mailed on Aug. 14, 2025, 40 pages.

* cited by examiner

METHOD AND SYSTEM FOR GENERATING A PIXEL STREAM

CROSS-REFERENCE TO RELATED APPLICATIONS

This application claims priority to European Patent Application No. 23 180 876.7 filed Jun. 22, 2023, European Patent Application No. 23 180 877.5 filed Jun. 22, 2023, and European Patent Application No. 23 196 195.4 filed Sep. 8, 2023, the disclosures of which are incorporated herein by reference.

TECHNICAL FIELD

The present disclosed subject matter relates to a method of generating a pixel stream from an image comprised of pixels which each have a pixel value, wherein the pixel stream is to be fed into a projector scanning a light beam across an image area according to a given scan pattern within a time interval, the light beam being modulated in intensity according to pixel values in the pixel stream. The present disclosed subject matter further relates to a projection system employing said method.

BACKGROUND

Projectors which scan a mono-coloured or multi-coloured light beam across an image area are commonly used in virtual reality (VR) or augmented reality (AR) glasses, helmets or head-up displays (HUDs) for a broad range of applications like navigation, training, entertainment, education or work. Driven by a light source driver, a light source emits the light beam onto a scanner, while the light source driver modulates the light beam in intensity according to pixel values, for example RGB values, of the pixels of an image. The scanner, e.g., a mirror assembly having one or more moving micro-electro-mechanical-system (MEMS) mirrors, deflects the light beam into subsequent directions (angles) according to a scan pattern towards the image area, e.g., a wall, a board, a projection screen, a poster, the retina of an eye, an augmented reality (AR) combiner waveguide, another combiner optics, or the like, one or more directions (angles) per pixel of the image to display the same on the image area.

In raster scanning the scanner scans the light beam across the image area row by row and line by line according to a raster scan pattern. In so-called Lissajous scanning the scanner scans the light beam across the image area according to a "dense" Lissajous pattern which allows for higher speeds of the light beams along the Lissajous pattern and hence higher frame rates, e.g., by exploiting resonances of the MEMS mirror.

With Lissajous scanning, higher speeds of the light beam along the Lissajous pattern and hence higher frame rates can be achieved with low driving powers and small actuators because of exploiting the resonance of the MEMS mirror. However, current Lissajous scanners suffer from a complex and slow synchronisation of the light source driver with the mirror assembly movement via a frame buffer that stores the image and feeds the light source driver with pixels. To synchronise the pixel feeding with the MEMS mirror position, the mirror driver periodically provides a synchronisation signal indicating the current mirror position within the Lissajous pattern to the frame buffer. The frame buffer identifies the currently needed pixel in the image for the indicated mirror position, retrieves its pixel value from the frame buffer and feeds the same to the light source driver. While this setup ensures that each pixel value provided to the light source driver matches the current MEMS mirror position, the buffer requires a high processing power for identifying the currently needed pixel and accessing the memory locations in the buffer that are scattered according to the Lissajous pattern.

To overcome these problems of real-time synchronised frame buffers, the pixel values may be predetermined by a central processing unit (CPU) in that order in which they are to be displayed according to the scan pattern and then be fed to the light source driver (optionally via an intermediate buffer) in that order in a pixel stream. In this way, an approximate synchronisation of the light source driver and the CPU suffices to display the correct pixel values at the respective time. Current methods and systems to generate such pixel streams, however, involve massive numbers of memory accesses, require fast memory and cause high CPU loads, in particular for high resolution images and high frame rates. Moreover, an adaption of the pixel values on-the-fly, e.g., to account for changed ambient lighting, is nearly infeasible to implement.

BRIEF SUMMARY

It is an object of the present disclosed subject matter to provide a method and a projection system which allow for a fast generation of a pixel stream and, thus, for displaying an image with a high resolution and/or at a high frame rate.

In a first aspect of the disclosed subject matter this object is achieved with a method of generating a pixel stream from an image comprised of pixels which each have a pixel value, wherein the pixel stream is to be fed into a projector scanning a light beam across an image area according to a given scan pattern within a time interval, the light beam being modulated in intensity according to pixel values in the pixel stream, comprising:

storing the image in a memory;
determining, for each of successive sub-intervals which together form the time interval, that pixel that is to be displayed by the light beam within said sub-interval according to the scan pattern;
for each of successive sequences of one or more successive sub-intervals for which the same pixel has been determined: retrieving the pixel value of said pixel from the memory once and appending the retrieved pixel value N times to the pixel stream, N being the number of sub-intervals in said sequence and at least one sequence having an N>1.

The present method utilises the fact that most scanners scan the light beam over the image area with a non-uniform speed of the light beam along the scan pattern and/or most scan patterns have non-uniform path lengths of the light beam in different pixels, each resulting in a non-uniform duration of stay of the light beam within different pixels. As a consequence, at least some pixels, e.g., at the boundary of the image where the speed of the light beam is low for many scanners, are typically to be displayed for a number N>1 of successive sub-intervals of an (image display) time interval.

According to the present method the respective to-be displayed-pixel of each sub-interval is determined, sequences of same pixel sub-intervals are identified and for each sequence, in particular for those sequences having more than one sub-interval, the pixel value of the respective same pixel is retrieved by only one single memory access for appending the pixel value of that same pixel N times to the pixel stream. Hence, sequences of same pixels are forecast and employed to reduce the required memory accesses by a factor N for each sequence.

As the number of load expensive memory accesses is reduced, a fast generation of the pixel stream is enabled. With the fast generation of the pixel stream, more pixel values can be fed to the projector per time interval such that images can be displayed at a higher resolution and/or at a higher frame rate. In addition, reduced memory accesses reduce the load on a CPU carrying out the method, which frees additional CPU resources and allows for an adaption of the pixel values on-the-fly, e.g., to account for changed ambient lighting.

In some embodiments the to-be-displayed pixel of each sub-interval may be determined based on an on-the-fly calculation of the scan pattern. For a particularly fast determination, however, in an optional embodiment the scan pattern is stored in the form of a look-up table of memory addresses of the pixels to be successively displayed, and said determining and retrieving includes accessing the look-up table. In this way the pixel of each sub-interval is quickly determined by its memory address and the pixel value of each sequence quickly retrieved, simply by accessing the look-up table to obtain the memory addresses of the pixels and then the memory to retrieve the pixel values according to the memory addresses.

The memory addresses may be stored in the look-up table in any format, as long as they provide an indication of the pixels to be displayed in the correct play-out order. The disclosed subject matter provides for two beneficial variants of a look-up table.

In the first beneficial variant the look-up table is a succession of memory addresses, one memory address for each sub-interval, and the sequences are identified by detecting successively equal memory addresses in the succession. With this look-up table format the sequences can be efficiently detected as successively equal memory addresses and said number N be easily identified by counting the number of successively equal memory addresses of each detected sequence.

In the second beneficial variant the look-up table includes one memory address for each sequence and the respective number N of sub-intervals of that sequence. This look-up table format provides the memory addresses in a compact run-length encoded form, with only one memory address per sequence and its run-length (number) N. Hence, this format is memory efficient, especially for larger run-lengths N. As each sequence is indicated by a new entry in the look-up table, a particularly fast identification of the sequences is achieved. Due to the direct provision of the run-lengths N, the same need not be calculated but simply read-out so that this embodiment is particularly load-efficient.

The scan pattern may be a raster scan pattern or a non-raster scan pattern, e.g., a spiral pattern. In a favourable embodiment the scan pattern is a Lissajous pattern, which allows to exploit resonances of the mirrors of the mirror assembly and, hence, to achieve higher speeds of the light beam and higher frame rates.

In a second aspect the present disclosed subject matter provides for a projection system for displaying an image comprised of pixels which each have a pixel value, comprising:

a projector with a light source configured to emit a light beam, a light source driver configured to modulate the light beam in intensity according to the pixel values fed to the projector in a pixel stream, and a scanner configured to scan the light beam across an image area according to a given scan pattern within a time interval; and a central processing unit, CPU, configured to
store the image in a memory,
determine, for each of successive sub-intervals which together form the time interval, that pixel that is to be displayed by the light beam within said sub-interval according to the scan pattern,
for each of successive sequences of one or more successive sub-intervals for which the same pixel has been determined: retrieve the pixel value of said pixel from the memory once and append the retrieved pixel value N times to the pixel stream, N being the number of sub-intervals in said sequence and at least one sequence having an N>1, and
feed the pixel stream towards the projector for displaying.

The projection system utilises the pixel stream generated by the CPU according to the present method in order to display an image. To this end the projection system may utilise any of the above-mentioned embodiments to achieve the above-mentioned advantages.

In an optional embodiment the projection system further comprises a buffer interposed between the CPU and the projector to buffer the pixel stream and feed the same to the light source driver. In a possible variant of this embodiment the buffer is configured to feed the pixel stream in synchronism with the scanner to the projector for displaying. Such a synchronism may be achieved, e.g., by sending synchronisation or trigger signals from the scanner to the buffer, in order to couple the transmission of the pixel stream to the scanner movement.

BRIEF DESCRIPTION OF THE DRAWINGS/FIGURES

Figure 2:
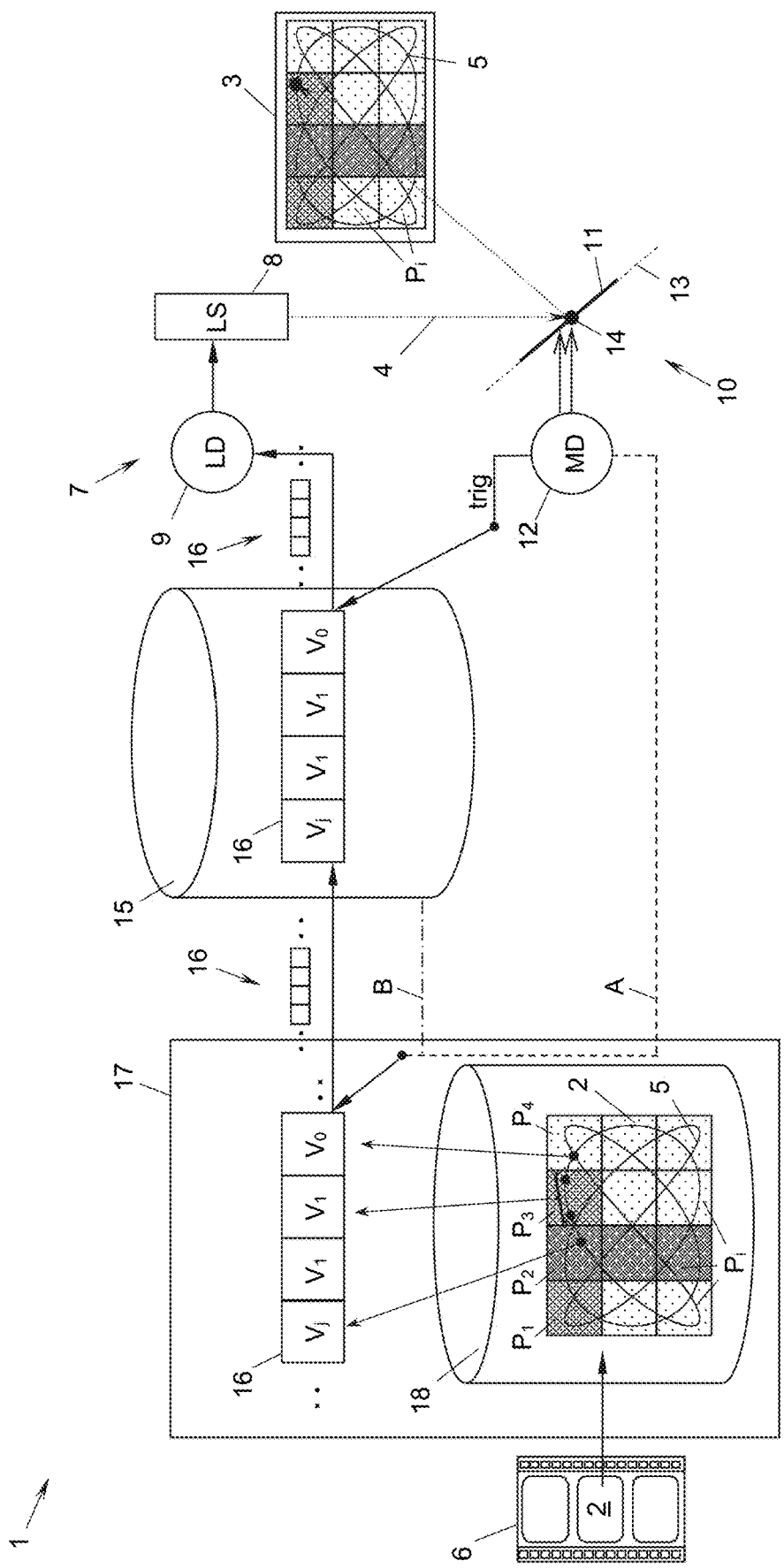
Figure 3:
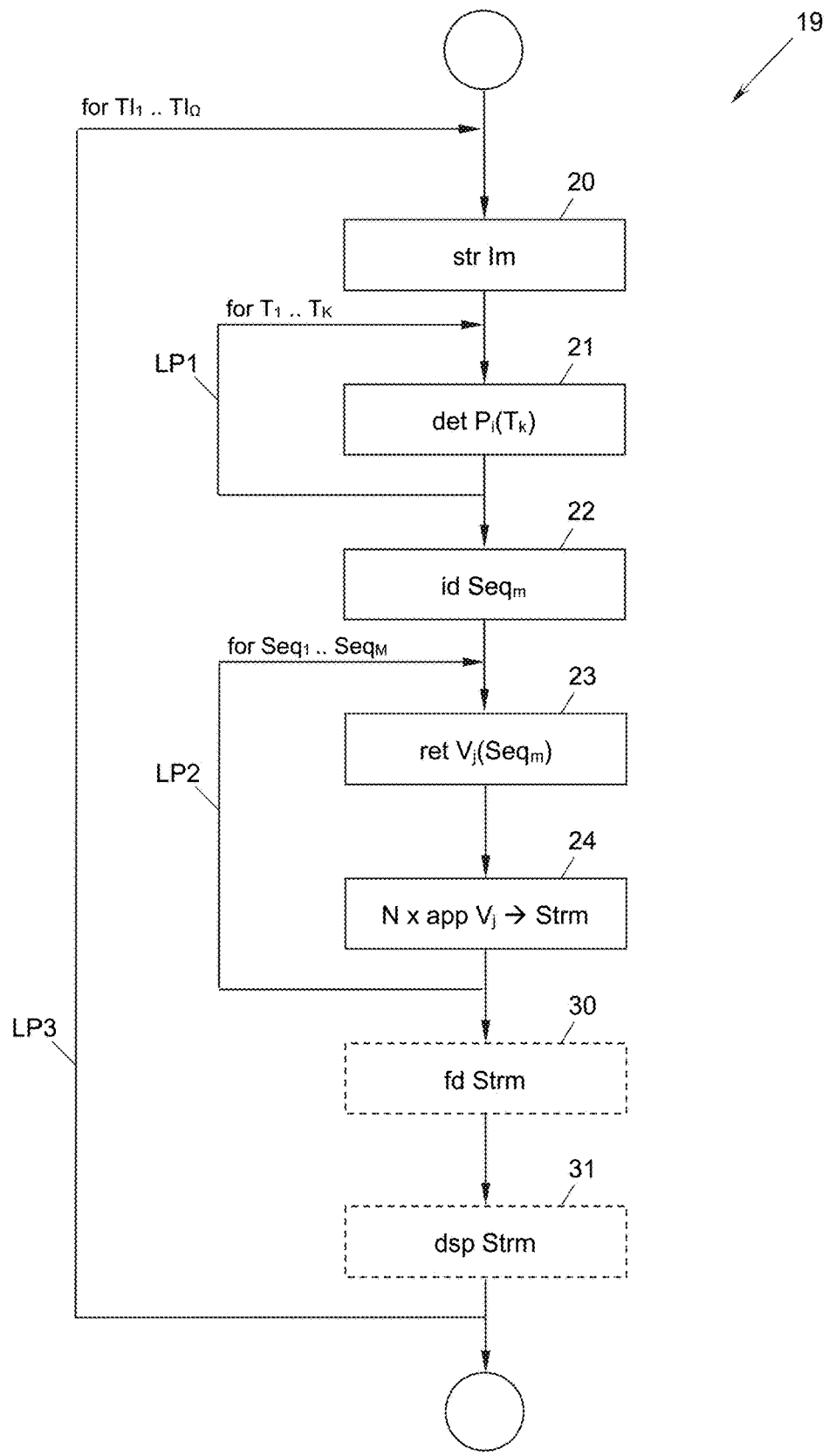
Figure 4:
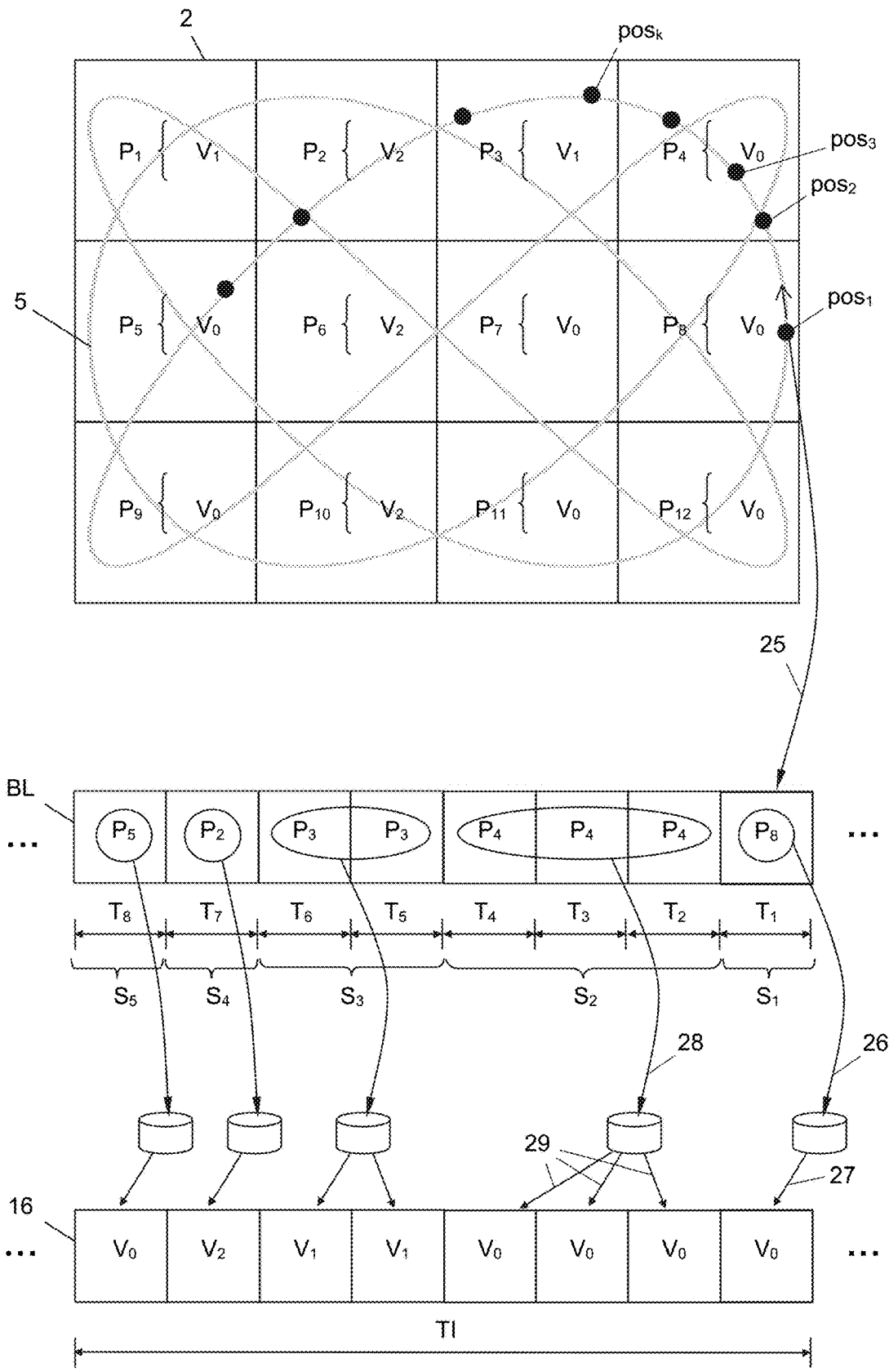
Figure 5:
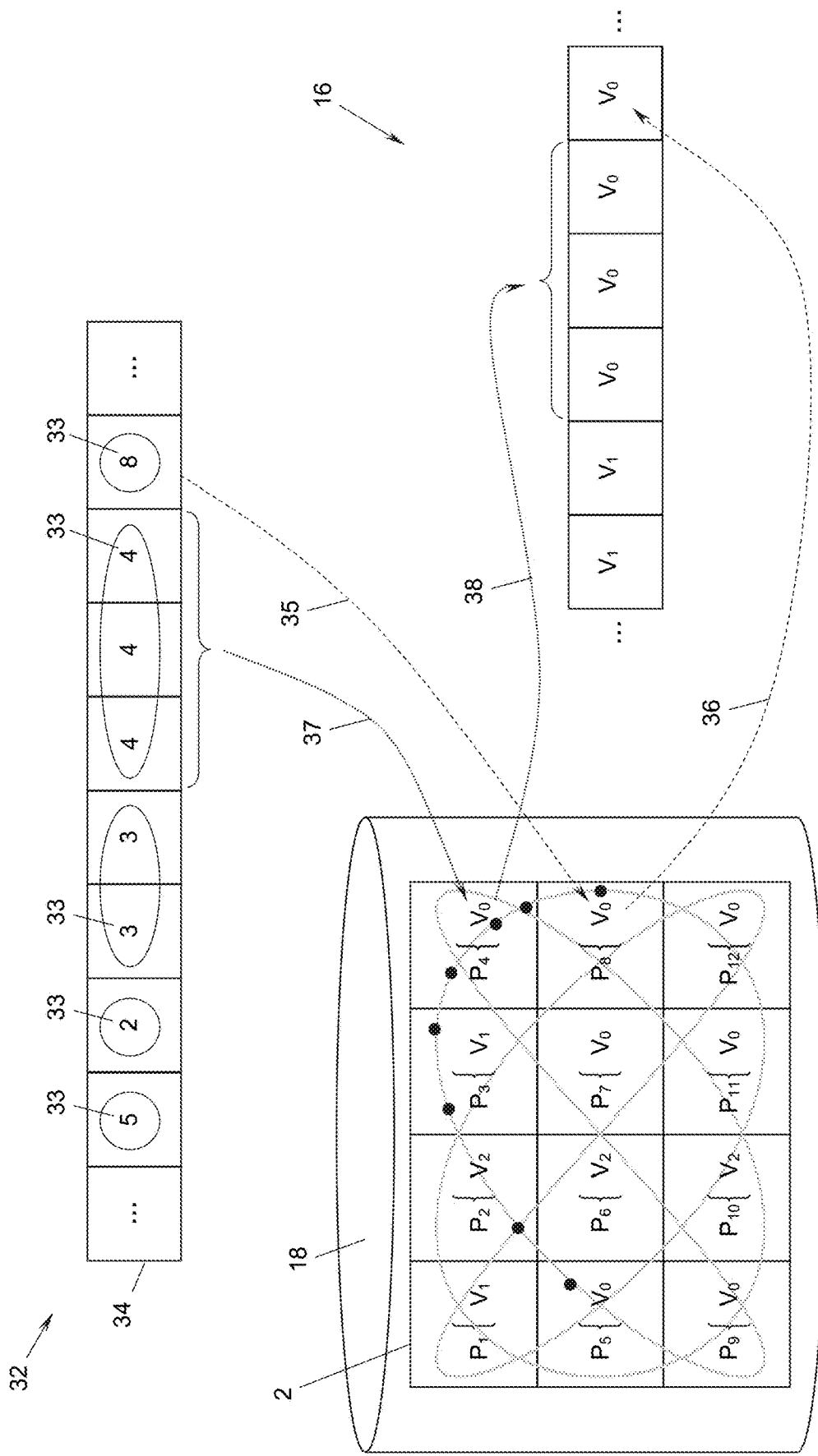
Figure 6:
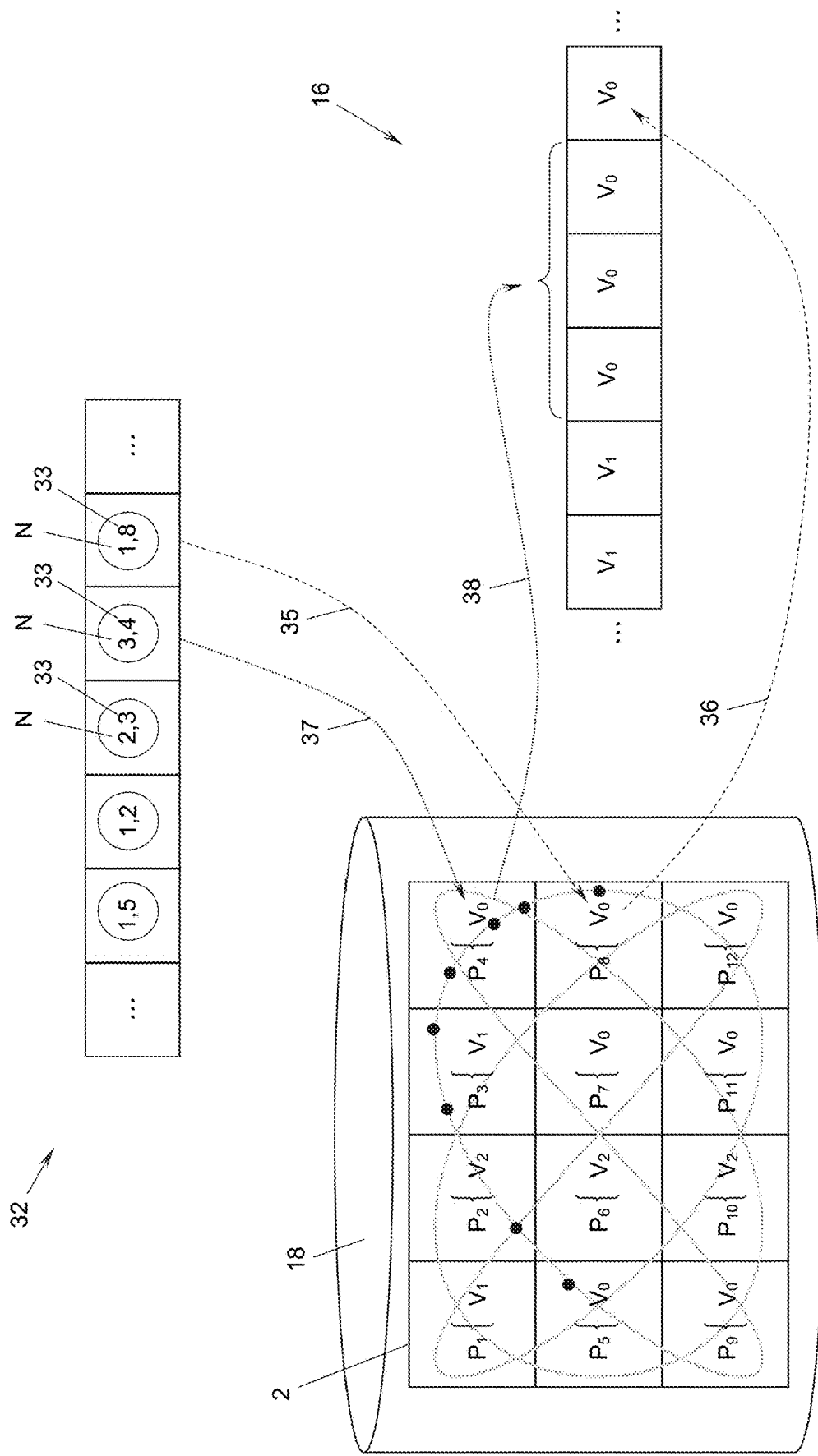

The disclosed subject matter will now be described by means of exemplary embodiments thereof with reference to the enclosed drawings, in which show:

FIG. 1 a projection system according to the disclosed subject matter, displaying pixel values of pixels of an image on an image area, in a perspective view;

FIG. 2 a central processing unit, a buffer, and a projector with a light source, a light source driver and a scanner of the projection system of FIG. 1 in a schematic circuit diagram;

FIG. 3 a method of generating a pixel stream from an image according to the present disclosed subject matter as performed by the projection system of FIG. 1 in a flow chart;

FIG. 4 an exemplary determination of pixels, retrieval of pixel values from the image and appending of the retrieved pixel values to a pixel stream according to the method of FIG. 3 in a schematic diagram;

FIG. 5 an exemplary determination of pixels and retrieval of pixel values by means of a first embodiment of a look-up table as performed by the central processing unit of FIG. 2 in a schematic diagram; and FIG. 6 a further exemplary determination of pixels and retrieval of pixel values by means of a second embodiment of a look-up table as performed by the central processing unit of FIG. 2 in a schematic diagram.

DETAILED DESCRIPTION

FIG. 1 shows a projection system 1 displaying an image 2 comprised of pixels $P_i$ onto a wall 3 by scanning the wall 3 with a pulsed or continuous, mono- or multi-coloured light beam 4 according to a scan pattern 5 (here: a Lissajous pattern) to draw, one after the other, pixel values $V_j$ (here: shown in grey scales) of the pixels $P_i$ of the image 2. The image 2 may have any form, e.g., rectangular, circular, etc., any pixel resolution, e.g., according to a conventional image or video standard such as full HD (1920×1080 pixels), UHD (3840×2160 pixels), 4K (4096×2160 pixels) etc., and the Lissajous pattern 5 may densely cover the pixels $P_i$; however, for illustrational purposes a rectangular image 2 with only a few pixels $P_i$ and a simple, coarse Lissajous pattern 5 are shown in FIG. 1.

The image 2 is displayed for at least one time interval TI of successive time intervals and may be part of a movie 6 or be a single image, e.g., a photo to be displayed for a longer period of time. Instead of a wall 3, the projection system 1 could display the light beam 4 onto any kind of image area, such as a board, projection screen, poster, the retina of an eye, an augmented reality (AR) combiner waveguide, another combiner optics, or the like. Accordingly, the projection system 1 may be part of a videobeamer, AR or VR (virtual reality) glasses, a helmet, a head-up display, etc.

With reference to FIGS. 1 and 2, the projection system 1 has a projector 7 with a light source 8, a light source driver 9 and a scanner 10. The light source 8 emits the light beam 4 onto the scanner 10. To this end, the light source 8 may be any light source known in the art, e.g., an incandescent lamp, a gas, liquid or solid laser, a laser diode, an LED, etc.

The scanner 10 scans the light beam 4 across the wall 3 according to said scan pattern 5. The scanner 10 may be any scanner known in the art, e.g., comprising one or more movable deflectors or reflectors such as a scanning mirror, a scanning prism, a liquid lens, etc. In the embodiment shown, the scanner 10 is a mirror assembly which has one or more, here: one, micro-electro-mechanical-system, MEMS, mirror 11 deflecting the emitted light beam 4 towards the wall 3.

The MEMS mirror 11 is driven by a mirror driver 12 of the scanner 10 to oscillate about a horizontal axis 13 with a horizontal oscillation period $T_h$ and about a vertical axis 14 with a vertical oscillation period $T_v$, in order to deflect the emitted light beam 4 towards the wall 3 according to the Lissajous pattern 5. As the oscillation of the MEMS mirror 11, i.e. the movement of the scanner 10, determines the deflection pattern, i.e. the Lissajous pattern 5, both the oscillation and the deflection are carried out according to one and the same Lissajous pattern 5. Instead of a Lissajous pattern 5 any other scan pattern, e.g., a raster pattern or another non-raster pattern, may be used.

Depending on the Lissajous pattern 5 to be displayed, $T_h$ and $T_v$ may be chosen such that the trajectory of the light beam 4 on the wall 3 densely covers the entire image 2 during a period of one image frame. Such a "complex" or "dense" Lissajous pattern 5 can be achieved when the frequencies $f_h=1/T_h$, $f_v=1/T_v$ are greater than the frame rate $f_{fr}=1/T_{fr}$, e.g., greater than 1 kHz or tens of kHz, and the beginnings of their respective oscillation periods meet, e.g., only over every one or more image frames, in particular when the frequencies $f_h$, $f_v$ are close to each other. To this end, integer frequencies $f_h$, $f_v$ with a small greatest common divisor, e.g., smaller than 10, may be employed.

The light source 8 is driven by the light source driver 9 which modulates the light beam 4 in intensity according to pixel values $V_j$ fed into the light source driver 9 to display the pixel values $V_j$. In case the light source 8 displays a mono-colour, black and white, or grey scale image 2 with a mono-coloured light beam 4, each pixel $P_i$ comprises a single component pixel value $V_j$, e.g., a brightness or intensity value, and in case the light source 8 displays a multi-colour image 2 with a multi-coloured light beam 4, each pixel comprises a multi component pixel value $V_j$, e.g., an RGB value indicating the brightness or intensity of a red, green, and blue colour, an YPbPr value, etc. To display the pixel values $V_j$, the light source driver 9 may alter the power, the pulse width and/or the pulse rate of the light beam 4 (in case of a multi-coloured light beam 4: of respective partial light beams of different colours forming the multi-coloured light beam 4).

To synchronise the light source driver 9 and the mirror driver 12 the projection system 1 optionally has a buffer 15 which is connected to the light source driver 9 and the mirror driver 12. The buffer 15 buffers the pixel values $V_j$ in form of a pixel stream 16 which includes the pixel values $V_j$ of the pixels $P_i$ of the image 2 in the correct order, i.e. in that order in which they are to be displayed. The buffer 15, e.g., by means of an internal buffer controller, feeds—synchronised by the mirror driver 12—the buffered pixel values $V_j$ to the light source driver 9.

In one embodiment the buffer 15 feeds the buffered pixel values $V_j$ of the pixel stream 16 each time a synchronisation or trigger signal "trig" is received. In another embodiment the buffer 15 feeds the pixel values $V_j$ successively according to an internal clock of the buffer 15, which internal clock may optionally be re-synchronised with the frequencies $f_h$, $f_v$ of the mirror driver 12 each time it receives the trigger signal trig.

To supply the buffer 15 with the pixel values $V_j$ in said correct order the projection system 1 has a central processing unit (CPU) 17. The CPU 17 transforms the image 2, whose pixels $P_i$ and pixel values $V_j$ are not ordered according to the Lissajous pattern 5, to the pixel stream 16 whose pixel values $V_j$ are ordered according to the Lissajous pattern 5. The CPU 17 then transfers the pixel stream 16 (at once or in parts) to the buffer 15 for buffering. The CPU 17 stores the image 2 in a memory 18 which may be part of the CPU 17 or external therefrom. To carry out these tasks, the CPU 17 may be any central or main processor and may optionally comprise dedicated coprocessors such as a graphics processing unit (GPU) or the like.

With reference to FIGS. 3 to 6, a method 19 for generating the pixel stream 16 will now be explained. The method 19 may be carried out by the CPU 17 and comprises the following steps 20-24:

In a first step 20 of the method 19 the image 2 is stored in the memory 18.

Then, the pixels $P_i$ to be successively displayed are determined in the correct play-out order. To this end, for each sub-interval $T_1, T_2, \ldots, T_K$, generally $T_k$, which together form said time interval TI, a second step 21 of determining the respective pixel $P_i$ for that sub-interval $T_k$, i.e. that pixel $P_i$ that is to be displayed by the light beam 4 within said sub-interval $T_k$, is carried out in a loop LP1.

In the example of FIG. 4 in the first sub-interval $T_1$ the light beam 4 traverses a respective first position $pos_1$ within the Lissajous pattern 5. According to this position $pos_1$ within the Lissajous pattern 5 the light beam 4 is to display pixel $P_8$ within the first sub-interval $T_1$. Hence, pixel $P_8$ is determined for the first sub-interval $T_1$, see arrow of correspondence 25. Accordingly, following the Lissajous pattern 5, in the subsequent sub-intervals $T_2, T_3, \ldots, T_k$ the light beam 4 traverses respective further positions $pos_2, pos_3, \ldots, pos_k$ at which the pixels $P_4, P_4, P_4, P_3, P_3, P_2$ and $P_5$ are to be successively displayed and, hence, determined in the steps 21, see the exemplary block BL of determined pixels $P_i$.

It is noted that due to non-uniform velocity of scanning and non-uniform lengths of the Lissajous pattern 5 within different pixels $P_i$ the positions $pos_k$ will typically be distributed non-uniformly across the image 2 such that different regions (pixels $P_i$) of the image 2 will have different densities of positions $pos_k$. Hence, the number of positions $pos_k$ and sub-intervals $T_k$ per pixel $P_i$ will vary across the image 2 as shown in FIG. 4.

It is further noted that step 21 does not require the retrieval of any pixel value $V_j$ yet but is only based on the location of the pixels $P_i$ within the image 2, the scan pattern 5 and the timing provided by the respective sub-interval $T_k$.

The scan pattern 5 on the image 2 and the pixels $P_i$ to be displayed according to the scan pattern 5 may be calculated in step 21, e.g., starting from an initial orientation of the scanner 10 provided to the CPU 17 by the scanner 10. Alternatively, the scan pattern 5 on the image 2 and the pixel $P_i$ (or its memory address) may be provided in the form of a look-up table and determined therefrom as explained below with reference to FIGS. 5 and 6.

In another step 22 successive sequences $S_1, S_2, \ldots, S_M$, generally $S_m$, of successive sub-intervals $T_k$ for which the same pixel $P_i$ has been determined in steps 21 of the loop LP1 are identified. FIG. 4 illustrates an exemplary identification of five sequences $S_1$-$S_5$ (the corresponding pixels $P_i$ are enclosed by a respective ellipse or circle), for instance a first sequence $S_1$ of only one sub-interval $T_1$ for which pixel $P_8$ has been determined, a second sequence $S_2$ of three sub-intervals $T_2$-$T_4$ for which pixel $P_4$ has been determined, etc. Thus, same-pixel-sequences $S_m$ are "forecast" in step 22.

For each of the identified sequences $S_m$ subsequent steps 23 and 24 are carried out in a second loop LP2 to add the pixel values $V_j$ to the pixel stream 16 in the correct order. In step 23 of the loop LP2 the respective pixel value $V_j$ of the sequence $S_m$, i.e. of that pixel $P_i$ which has been determined for the sub-intervals $T_k$ of that sequence $S_m$ in step 21, is retrieved from the memory 18. In step 24 of the loop LP2, the retrieved pixel value $V_j$ is appended to the pixel stream 16 as often as it is to be displayed within the sequence $S_m$, i.e. N times, which number N corresponds to the number of sub-intervals $T_k$ in that sequence $S_m$.

For instance, in the example of FIG. 4, the first sequence $S_1$ has one single sub-interval $T_1$ for which pixel $P_8$ has been determined in step 21, i.e. N=1 for sequence $S_1$. Thus, for the first sequence $S_1$, the pixel value $V_0$ of pixel $P_8$ is retrieved once from the memory 18 in step 23 (see arrow 26) and appended once in step 24 (see arrow 27) in the first run of the loop LP2. Similarly, the second sequence $S_2$ has three sub-intervals $T_2$-$T_4$ for which pixel $P_4$ has been determined in step 21, i.e. N=3 for sequence $S_2$. Hence, for the second sequence $S_2$, the pixel value $V_0$ of pixel $P_4$ is retrieved once from the memory 18 in step 23 (see arrow 28) and appended three times to the pixel stream 16 in step 24 (see arrows 29) in the second run of the loop LP2. Thus, to append three pixel values $V_j$ only one memory access is required, a factor N less compared to a pixel stream generation without a forecast of same-pixel-sequences $S_m$. This retrieving and appending is continued for the subsequent sequences $S_3$, $S_4, \ldots$ in the further runs of the loop LP2 to prolong the pixel stream 16.

It shall be noted that the pixel stream 16 may initially be generated when the first pixel value $V_j$ is appended.

Steps 23 and 24 may be carried out in an alternating manner, i.e. for each sequence $S_m$ the pixel value $V_j$ may be retrieved in step 23 and immediately appended in step 24, or in a successive manner, i.e. for all sequences $S_m$ of the time interval TI first the pixel values $V_j$ may be retrieved by carrying out step 23 for all sequences $S_m$ and then all of the retrieved pixel values $V_j$ may be appended by carrying out step 24 for all sequences $S_m$.

Optionally—in an "online" or "on-the-fly" embodiment—the generated pixel stream 16 is fed towards the light source driver 12 in a step 30 either directly (in embodiments without the buffer 15) or via the buffer 15. In a further optional step 31 of the method 19 the pixel stream 16, i.e. the pixel values $V_j$ included therein, may be displayed by the projector 7.

As shown in FIG. 3, to prolong the pixel stream 16 for further images 2, the steps of storing (step 20), determining (step 21), identifying (step 22), retrieving (step 23) and appending (step 24) may be repeated in a loop LP3 for one or more further time intervals TI, optionally with the steps of feeding (step 30) and displaying (step 31) to display the prolonged pixel stream 16.

The CPU 17 may feed (optionally: parts of) the pixel stream 16 when it is triggered by the mirror driver 9 as indicated by the dashed line A in FIG. 2, or when the buffer 15 indicates a low filling level as indicated by the chain-dotted line B in FIG. 2, or each time a predetermined time interval has lapsed, e.g., every n-th cycle of the clock of the CPU 17, or the like.

The determining of the pixels $P_i$, the identification of the sequences $S_m$, and the retrieving of the pixel values $V_j$ in steps 21-23 may be carried out in many ways. In one embodiment (two variants of which are shown in FIGS. 5 and 6), a look-up table 32 of memory addresses 33 of the pixels $P_i$ to be successively displayed is employed. The look-up table 32 encodes the Lissajous pattern 5 by means of the successive memory addresses 33 such that the pixels $P_i$ can be determined and retrieved by the memory addresses 33. With reference to FIGS. 5 and 6, two variants of a look-up table 32 which store the Lissajous pattern 5 of FIG. 4 shall now be described.

In the first look-up table variant shown in FIG. 5, the look-up table 32 is a succession 34 of memory addresses 33 of the pixels $P_i$, wherein one memory address 33 is stored for each sub-interval $T_k$, here: the memory address '8' (of pixel $P_8$) for the first sub-interval $T_1$, the memory address '4' (of pixel $P_4$) for the second sub-interval $T_2$, etc. in the order that the corresponding pixels $P_i$ are to be displayed according to the Lissajous pattern 5. In this embodiment the pixel $P_i$ of each sub-interval $T_k$ is determined in step 21 by its memory address 33 in the look-up table 33, e.g., pixel $P_8$ is determined as '8'. The sequences $S_m$ are identified in step 22 by detecting successively equal memory addresses 33 (depicted as enclosed circles and ellipses) in the succession 34, e.g., sequence $S_2$ is identified by three successively equal memory addresses '4'. The number N may be identified by counting the successively equal memory addresses 33 in the succession 34. For each sequence $S_m$ the memory 18 is accessed once to retrieve the respective pixel value $V_j$ and the pixel value $V_j$ is appended N times as described above and illustrated in FIG. 5, e.g., by arrows 35 and 36 (for sequence $S_1$) and arrows 37 and 38 (for sequence $S_2$).

In the second look-up table variant shown in FIG. 6, the look-up table 32 is stored in a run-length encoded form and includes, for each sequence $S_m$ (the sequence-correspondence denoted by circles), one memory address 33, i.e. the memory address 33 of the same pixel $P_i$ for that sequence $S_m$, and the respective number (run-length) N of sub-intervals $T_k$ of that sequence $S_m$ indicating how long that sequence $S_m$ is to be displayed according to the Lissajous pattern 5. In the example of FIG. 6, the look-up table 32 includes the memory address '8' and number N='1' for the first sequence $S_1$, the memory address '4' and number N='3' for the second sequence $S_2$, etc. to encode the Lissajous pattern 5 shown in FIG. 4.

In this look-up table variant each sequence $S_m$ is identified and the respective pixel $P_i$ determined in steps 21 and 22 from a respective one of successive entries of the look-up table 32. For instance, in FIG. 6 the first pixel $P_i$ of the first sequence $S_1$ is determined by its memory address '8' and the first sequence $S_1$ is identified as the first entry with a run-length of one sub-interval '1', the second pixel $P_i$ of the second sequence $S_2$ is determined by its memory address '4' and the second sequence $S_2$ is identified as the second entry with a run-length of three sub-intervals '3', and so on and so forth. Again, for each sequence $S_m$, the memory 18 is accessed once to retrieve the respective pixel value $V_j$ in step 23 and the retrieved pixel value $V_j$ is appended N times (N here being read-out from the look-up table 32) as described above and illustrated in FIG. 6, e.g. by arrows 40 and 41 (for sequence $S_1$) and arrows 42 and 43 (for sequence $S_2$).

It is noted that the projector 7 may employ a multi-coloured light beam with partial light beams that are mutually offset, e.g. angular and/or transversal. In this case any partial light beam may be seen as "the light beam" in the meaning of the present disclosure, i.e. the method described herein may be applied separately for each of said partial light beams with a respective scan pattern 5 and generated pixel stream 16.

It is further noted that the method 19 described herein may be carried out on-the-fly, i.e., the generated pixel stream 16 (or parts thereof) may be immediately fed into the projector 7, or offline, i.e., the generated pixel stream 16 may be stored for a feeding later on.

Moreover, the steps 20-24, 30 and 31 of the method 19 may be carried out in any order (some even simultaneously or in parallel), so far as one step does not depend on the result of another step. For example, in a look-up table embodiment the identification of the sequences $S_m$ (step 22) and the determination of the respective pixel $P_i$ (step 21) based on the entries in the look-up table 32 may be carried out simultaneously.

The disclosed subject matter is not restricted to the specific embodiments described above but encompasses all variants, modifications and combinations thereof that fall within the scope of the appended claims.

What is claimed is:

1. A method of generating a pixel stream from an image comprised of pixels which each have a pixel value, wherein the pixel stream is to be fed into a projector scanning a light beam across an image area according to a given scan pattern within a time interval, the light beam being modulated in intensity according to pixel values in the pixel stream, comprising:
   storing the image in a memory;
   determining, for each of successive sub-intervals which together form the time interval, that pixel that is to be displayed by the light beam within said sub-interval according to the scan pattern;
   identifying successive sequences of one or more successive sub-intervals for which the same pixel has been determined; and
   for each of the identified successive sequences of one or more successive sub-intervals for which the same pixel has been determined: retrieving the pixel value of said pixel from the memory once and appending the retrieved pixel value N times to the pixel stream, N being a number of sub-intervals in said sequence and at least one sequence having an N>1.

2. The method according to claim 1, wherein the scan pattern is stored in a form of a look-up table of memory addresses of the pixels to be successively displayed, and wherein said determining and retrieving includes accessing the look-up table.

3. The method according to claim 2, wherein the look-up table is a succession of memory addresses, one memory address for each sub-interval, and wherein the sequences are identified by detecting successively equal memory addresses in the succession.

4. The method according to claim 2, wherein the look-up table includes one memory address for each sequence and the respective number N of sub-intervals of that sequence.

5. The method according to claim 1, wherein said scan pattern is a Lissajous pattern.

6. A projection system for displaying an image comprised of pixels which each have a pixel value, comprising:
   a projector with a light source configured to emit a light beam, a light source driver configured to modulate the light beam in intensity according to the pixel values fed to the projector in a pixel stream, and a scanner configured to scan the light beam across an image area according to a given scan pattern within a time interval; and
   a central processing unit, CPU, configured to
   store the image in a memory,
   determine, for each of successive sub-intervals which together form the time interval, that pixel that is to be displayed by the light beam within said sub-interval according to the scan pattern,
   identify successive sequences of one or more successive sub-intervals for which the same pixel has been determined; and
   for each of the identified successive sequences of one or more successive sub-intervals for which the same pixel has been determined: retrieve the pixel value of said pixel from the memory once and append the retrieved pixel value N times to the pixel stream, N being a number of sub-intervals in said sequence and at least one sequence having an N>1, and
   feed the pixel stream towards the projector for displaying.

7. The projection system according to claim 6, wherein the CPU is configured to store the scan pattern in a form of a look-up table of memory addresses of the pixels to be successively displayed, and to determine the pixels and retrieve the pixel values by accessing the look-up table.

8. The projection system according to claim 7, wherein the look-up table is a succession of memory addresses, one memory address for each sub-interval, and wherein the CPU is configured to identify the sequences by detecting successively equal memory addresses in the succession.

9. The projection system according to claim 7, wherein the look-up table includes one memory address for each sequence and the respective number N of sub-intervals of that sequence.

10. The projection system according to claim 6, wherein said scan pattern is a Lissajous pattern.

11. The projection system according to claim 6, further comprising a buffer interposed between the CPU and the projector.

12. The projection system according to claim 11, wherein the buffer is configured to feed the pixel stream in synchronism with the scanner to the projector for displaying.

* * * * *